March 4, 1969  S. E. COBLITZ  3,430,830

CUTTING ELEMENT FOR A PIPE-CUTTING CHAIN

Filed April 21, 1967

INVENTOR.
SANFORD E. COBLITZ
BY
Woodling, Krost, Granger and Rust
attys.

3,430,830
CUTTING ELEMENT FOR A PIPE-CUTTING CHAIN
Sanford E. Coblitz, 567 Knollwood Ave.,
Ashtabula, Ohio 44004
Filed Apr. 21, 1967, Ser. No. 632,749
U.S. Cl. 225—103       6 Claims
Int. Cl. B26f *3/00, 3/02;* B65h *35/00*

ABSTRACT OF THE DISCLOSURE

Segmental circular cutting elements for a pipe-cutting chain. At least a selected one of two adjacently disposed cutting elements having at least a chordally directed edge clearance surface and segmental cutting edge means encompassing less than 360 degrees, whereby the edge clearance surface clears the segmental cutting edge means of the other of the two adjacently disposed cutting elements. The cutting elements will make a deep cut into the pipe without decreasing the width of the side links of the chain and without increasing the longitudinal spacing between the pins upon which the cutting elements are mounted.

---

My invention relates generally to a pipe-cutting chain and more particularly to cutting elements therefor.

In my invention, the pipe-cutting chain is disposed to be wrapped around and tension-squeezed about the pipe for cutting into the pipe for parting or severing same. The pipe-cutting chain comprises generally a series of spaced apart side links and a plurality of transversely disposed pins connecting said series of side links together. The improvement of my invention relates to a cutting element disposed between the spaced apart side links and mounted respectively on the pins. In the prior art, the cutting elements are preferably circular or round and have a cutting edge that encompasses a complete circle of 360 degrees. The side links of the chain are preferably wide in order to provide the required strength to withstand the tension during the cutting operation. Difficulty is experienced in cutting a pipe where it is essential that the depth of the cut be deep and where a great deal of tension is required. In the prior art, the depth of the cut is limited since the circumferential cutting edge for the cutting elements does not extend laterally very far outside of the width of the side links. In my invention, the circumferentially directed cutting edge extends for a greater distance outside of the width of the side links, while retaining the same strength and width of the side links and without increasing the longitudinal spacing between the pins.

An object of my invention is to provide for making a deep cut into the pipe without decreasing the width of the side links and without increasing the longitudinal spacing between the pins.

Another object of my invention is the provision of a cutting element comprising substantially a segmental circular body having at least a chordally directed edge clearance surface and segmental cutting edge means encompassing less than 360 degrees.

Another object of my invention is the provision of interlocking the segmental circular bodies whereby they have limited rotational movement on the pins, thereby keeping the segmental cutting edge means in continuous contact with the pipe during the cutting operation.

Another object of my invention is the provision of a segmental circular cutting element, in which the terminal ends for the segmental cutting edge means are laterally spaced apart for a distance substantially equal to the maximum width of the chain links.

Another object is to provide for making a continuous cut or groove substantially entirely around the pipe without oscillating the chain about the pipe.

Another object is to provide for making a deep enough cut while retaining the longitudinal spacing between the pins, whereby the circumferential creep of the cutting elements will make a continuous cut or groove substantially entirely around the pipe without oscillating the chain about the pipe.

Other objects and a fuller understanding of the invention may be had by referring to the following description and claims, taken in conjunction with the accompanying drawings, in which:

Figure 1:
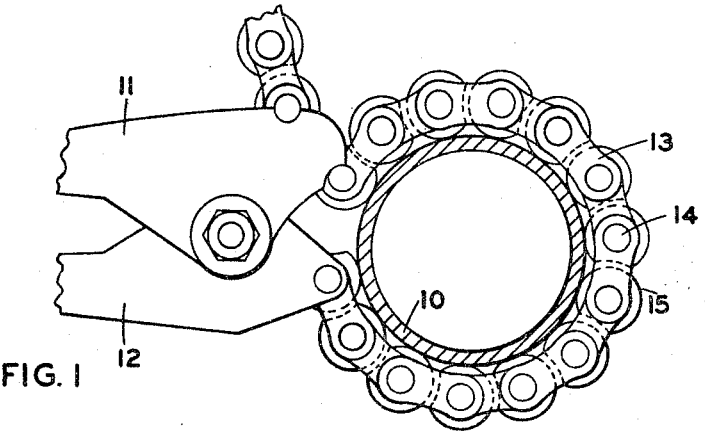
FIGURE 1 is a side view of a cutting chain embodying my improved cutting elements, with the chain being shown wrapped around a pipe for cutting into the pipe.

With reference to the drawing, the cutting chain, in FIGURE 1, is shown wrapped around a pipe 10 for tension-squeezing. The tension on the chain may be applied by a pair of jaws 11 and 12, which may be operated by levers or by power means. As tension is applied to the chain, the cutting elements 15 cut into the pipe for parting or severing the pipe. The chain is not disposed to be oscillated about the pipe. However, as the cutting elements 15 cut into the pipe, the effective diameter of the pipe becomes less and as a result, the cutting elements gradually creep in a circumferential direction about the pipe toward the jaws.

Figure 2:
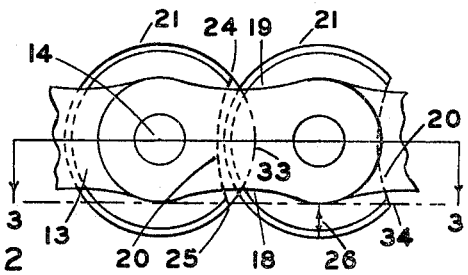
FIGURE 2 is an enlarged side view of a fragmentary portion of a cutting chain embodying my improved cutting elements.
Figure 3:
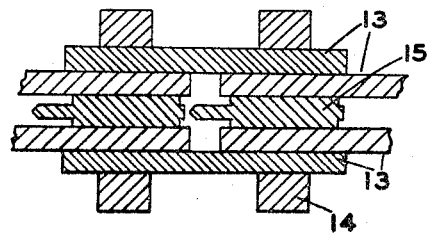
FIGURE 3 is a longitudinal cross-sectional view taken along the line 3—3 of the cutting chain shown in FIGURE 2.

The chain comprises generally a series of spaced apart side links 13 and a plurality of transversely disposed pins 14 connecting the series of side links together. My improved cutting elements are disposed between the spaced apart side links and are respectively mounted on the pins. FIGURES 2 and 3 show the preferred form of my cutting elements which are identified by the reference character 15. In the preferred form, my cutting elements are substantially identical. The side links 13 respectively have oppositely disposed longitudinally extending edge surfaces 18 and 19 which define the width thereof. The side links respectively have a maximum width in the region of a line passing generally through the center of the pins and a minimum width in the region of a line passing generally laterally through a point substantially mid-way between two adjacently disposed pins.

My improved cutting element 15 comprises substantially a segmental circular body having a chordally directed edge clearance surface 20 and segmental cutting edge means 21 encompassing less than 360 degrees. The chordally directed edge clearance surface 20 of a selected one of two adjacently disposed cutting elements clears the segmental cutting edge means 21 of the other of said two adjacently disposed cutting elements with the circles in which the two adjacently disposed cutting elements respectively reside intersecting each other. In FIGURE 2, the dash-dot line 33 illustrates a continuation of the segmental cutting edge means 21, or in other words, the dash-dot line 33 illustrates the circle in which the segmental cutting edge means of the left-hand cutting element resides. In FIGURE 3, the circle 33 in which the left-hand cutting element (selected one) resides intersects the segmental cutting edge means of the right-hand cutting element (the other of the two adjacently disposed cutting elements), whereby the distance between the two adjacently disposed pins upon which the two adjacently disposed cutting elements are respectively mounted is less than the sum of the two radii for the respective circles. Thus, the two adjacently disposed cutting elements are interlocked together, whereby they have limited rotational movement on the pins, which keeps the segmental cutting edge means 21 in continuous contact with the pipe during the cutting operation. The chordally directed edge clearance surface 20 may be straight, but preferably is defines a segment of a circle surrounding the pin upon which the next adjacent cutting element is mounted and intersects the segmental cutting edge means at two spaced circumferential points 24 and 25 which define respectively first and second terminal ends for the segmental cutting edge means 21. The first and second terminal ends have generally a lateral distance therebetween substantially equal to the maximum width of the chain links. This is illustrated in FIGURE 2, wherein the maximum width of the lower edge of the chain links is indicated by the dash-dot line 34. It is noted that the dash-dot line 34 is substantially on the same level as the terminal end 25. Likewise, the terminal end 24 is substantially on the same level as the maximum width of the upper edge of the chain links. Thus, the segmental cutting edge means 21 which extends laterally outside of the side links 13 is shown at 26. It is the distance 26 which determines the depth of the cut, because the cutting action is arrested when the side links engage the pipe. The distance 26 is in excess of what it would be if the cutting elements were completely round, encompasing 360 degrees. Therefore, with my improved cutting elements, the depth of the cut is increased without reducing the width of the side links and without increasing the distance between two adjacently disposed pins.

As a specific illustration between my invention and the prior art, the longitudinal spacing between two adjacently disposed pins may be approximately 2½ inches; the maximum width of the chain links may be approximately 2 inches, and the diameter of a cutting element may be slightly less than approximately 2½ inches in order to provide clearance therebetween. With the above dimensions, the depth of the cut would be approximately ¼ inch. In my invention, the longitudinal spacing between two adjacently disposed pins and the maximum width of the chain links remain the same. However, the diameter of the circle in which the segmental cutting elements reside may be approximately 3 inches, instead of 2 inches for the prior art. The depth of my cut would be approximately ½ inch, instead of ¼ inch for the prior art, and as a result, the creep of the cutting elements in a circumferential direction would be substantially twice that for the prior art. In my invention, the creep of the cutting element is sufficient to provide for making a continuous cut or groove substantially entirely around the pipe without oscillating the chain about the pipe.

Figure 4:
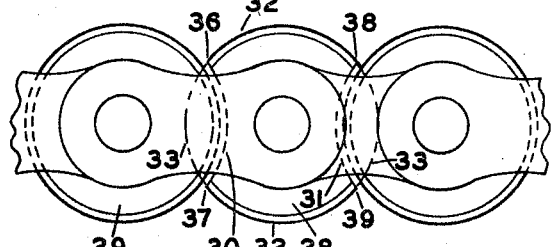
FIGURE 4 is a modified arrangement of my cutting elements.

FIGURE 4 shows a modification of my invention, in that a selected one (cutting element 28) of two adjacently disposed cutting elements 28 and 29, is provided with two oppositely disposed chordally directed clearance surfaces 30 and 31, while the other (cutting element 29) of the two adjacently disposed cutting element defines a complete circle of 360 degrees. The cutting element 28 makes an interlocking engagement with the cutting element 29, whereby it has limited rotational movement on the pin during the cutting operation. Thus, the segmental cutting means 32 on the cutting element 28 which extends laterally outside of the chain links, is kept in continuous contact with the pipe during the cutting operation. In FIGURE 4, the dash-dot lines 33 represent the circle in which the cutting element 28 resides. As in FIGURE 4, the reference characters 36 and 37 represent first and second terminal ends for the segmental cutting means 32, and the reference characters 38 and 39 represent third and fourth terminal ends for the segmental cutting means 32. Thus, the segmental cutting means 32 in FIGURE 4 comprises two segmental cutting edges. From the operation standpoint, the performance of the modification in FIGURE 4 is substantially the same as the performance for that of the preferred showing in FIGURES 2 and 3.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. In a cutting chain disposed to be wrapped around and tension-squeezed against a pipe for cutting into said pipe, said chain including a series of spaced apart side links and a plurality of transversely disposed pins connecting said series of side links together, the improvement of a plurality of cutting elements disposed between said spaced apart side links and mounted respectively on said pins, said cutting elements respectively having substantially circumferentially directed cutting edge means disposed to be tension-squeezed against said pipe for cutting into same, said circumferentially directed cutting edge means respectively residing in substantially a circle with said circles being substantially of the same diameter and with each circle surrounding a pin upon which said cutting elements are respectively mounted, at least a selected one of two adjacently disposed cutting elements comprising substantially a segmental circular body having at least a chordally directed edge clearance surface and segmental cutting edge means encompassing less than 360 degrees, said at least a chordally directed edge clearance surface clearing the other of said two adjacently disposed cutting elements with the circles in which said two adjacently disposed cutting elements respectively reside intersecting each other, whereby the distance between the two adjacently disposed pins upon which the two adjacently cutting elements are respectively mounted is less than the sum of the two radii for said respective circles in which said two adjacently disposed cutting elements respectively reside.

2. The structure of claim 1, wherein said other of said two adjacently disposed cutting elements comprises a circular body having cutting edge means encompassing a complete circle of 360 degrees.

3. The structure of claim 1, wherein said at least a selected one of said two adjacently disposed cutting elements comprises substantially a circular body having first and second oppositely disposed chordally directed edge clearance surfaces and segmental cutting edge means including at least first and second segmental cutting edges, said first chordally directed edge clearance surface intersecting said segmental cutting edge means at two spaced circumferential points and defining respectively first and second terminal ends for said segmental cutting edge means, said second chordally directed edge clearance surface intersecting said segmental cutting edge means at two other spaced circumferential points and defining respectively third and fourth terminal ends for said segmental cutting edge means, said segmental cutting edge means between said first and third terminal ends constituting said first segmental cutting edge and said segmental cutting edge means between said second and fourth terminal ends constituting said second segmental cutting edge.

4. The structure of claim 1, wherein said two adjacently disposed cutting elements are substantially identical with each other and with each comprising substantially a segmental circular body having at least a chordally directed clearance surface and segmental cutting edge means encompassing less than 360 degrees.

5. The structure of claim 1, wherein said side links respectively have oppositely disposed longitudinally extending edge surfaces defining generally the width thereof, said side links respectively having a maximum width in the region of a line passing generally laterally through the center of a pin and a minimum width in the region of a line passing generally laterally through a point substantially mid-way between two adjacently disposed pins, said at least a chordally directed edge clearance surface intersecting said segmental cutting edge means at two spaced circumferential points and defining respectively first and second terminal ends for said segmental cutting edge means, said first and second terminal ends having generally a lateral distance therebetween substantially equal to the maximum width of said chain links.

6. The structure of claim 1, wherein said chordally directed edge clearance surface defines a segment of a circle surrounding the pin of said other of said two adjacently disposed cutting elements.

References Cited

UNITED STATES PATENTS 3,221,962   12/1965   Small et al. _____ 225—103

JAMES M. MEISTER, *Primary Examiner.*

U.S. Cl. X.R.

30—100